Patented Oct. 11, 1932

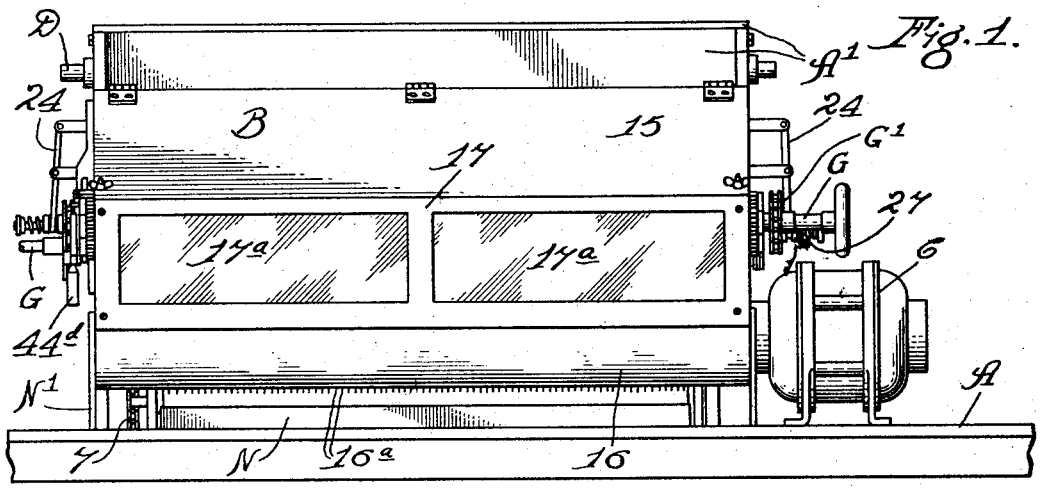
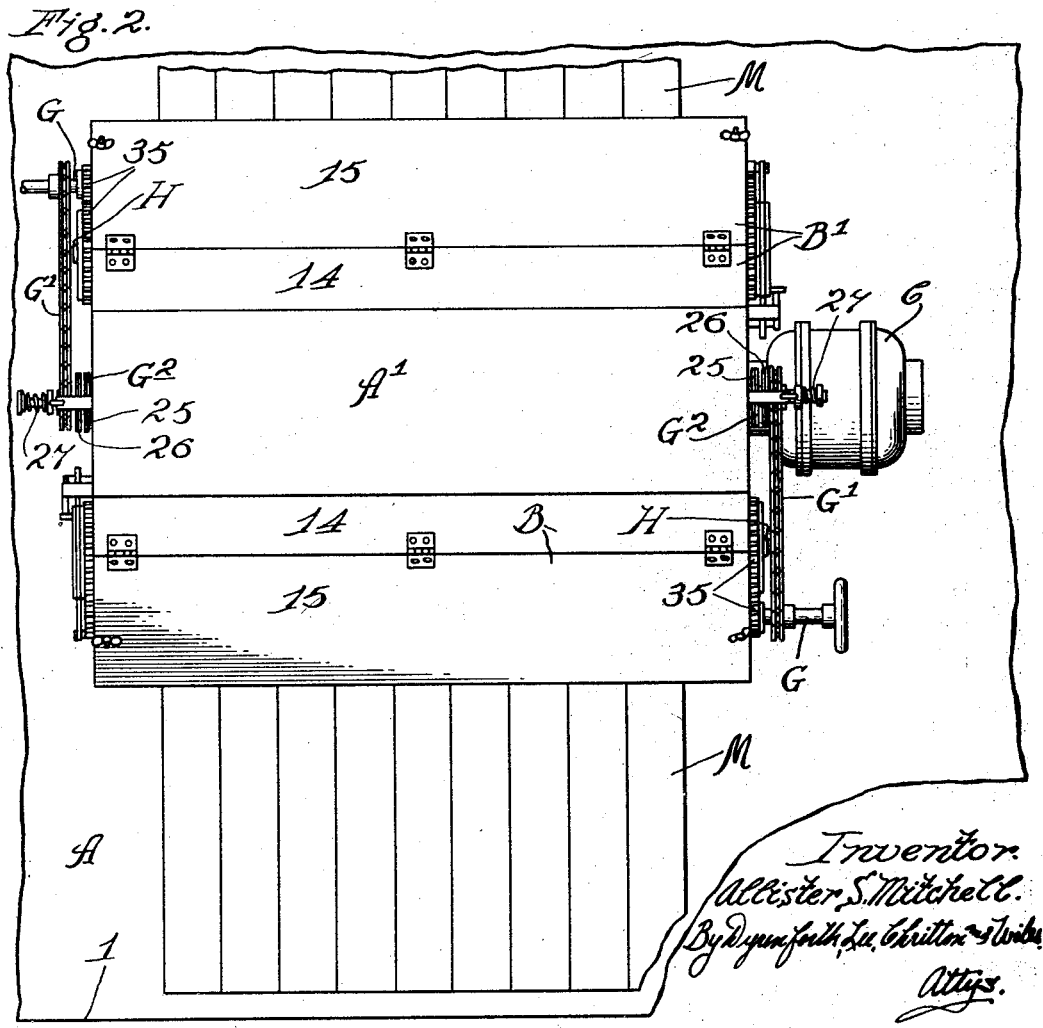

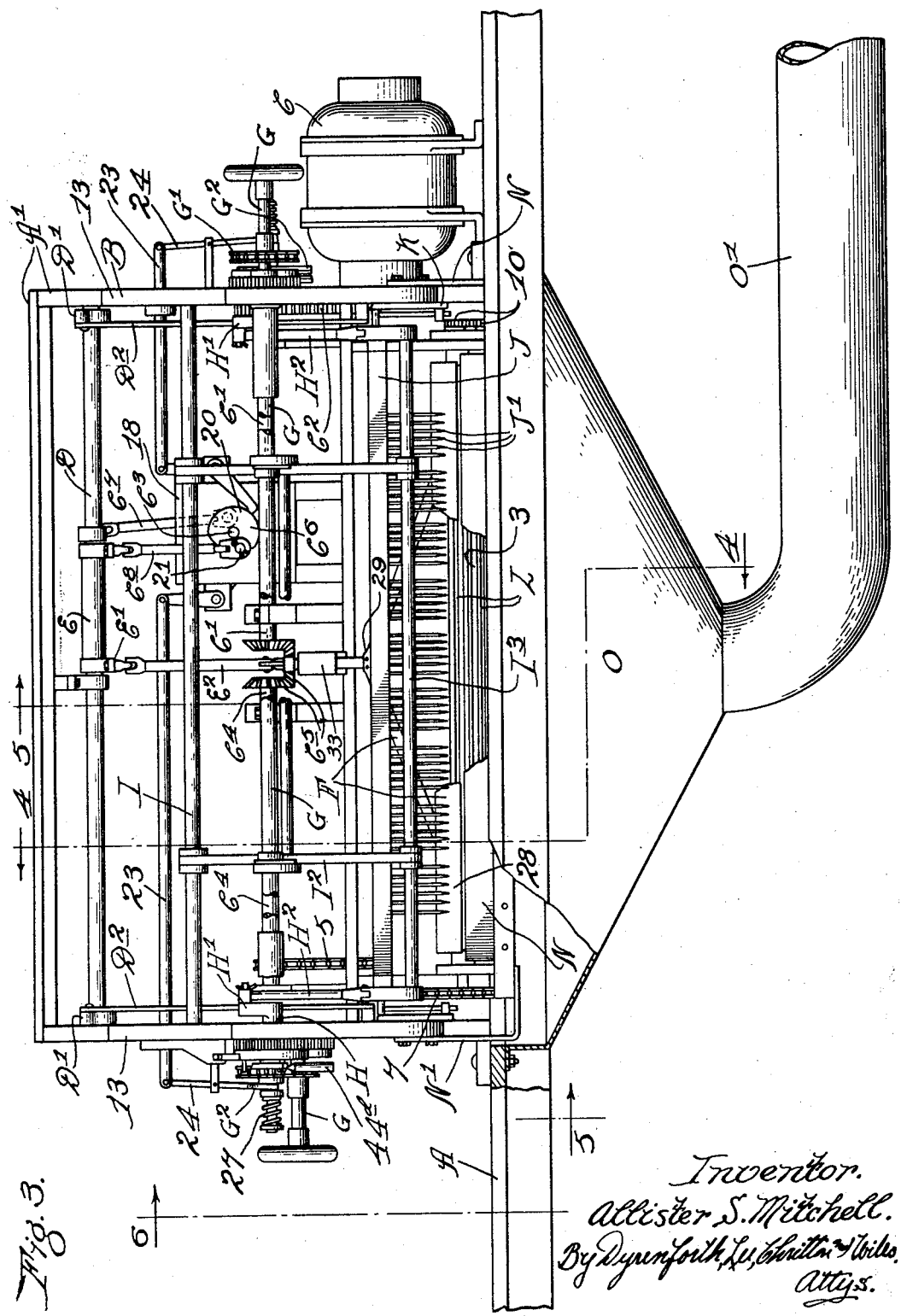

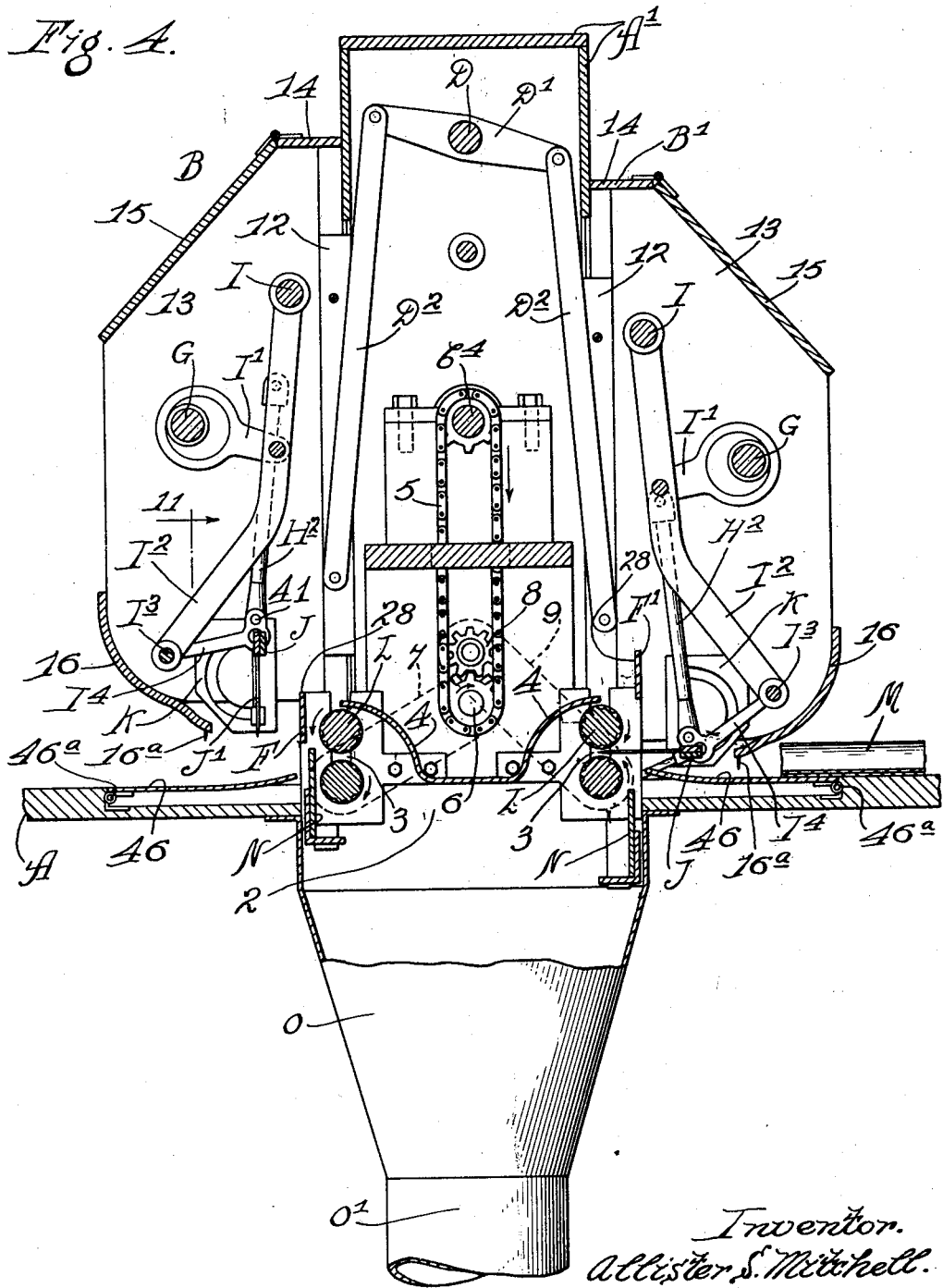

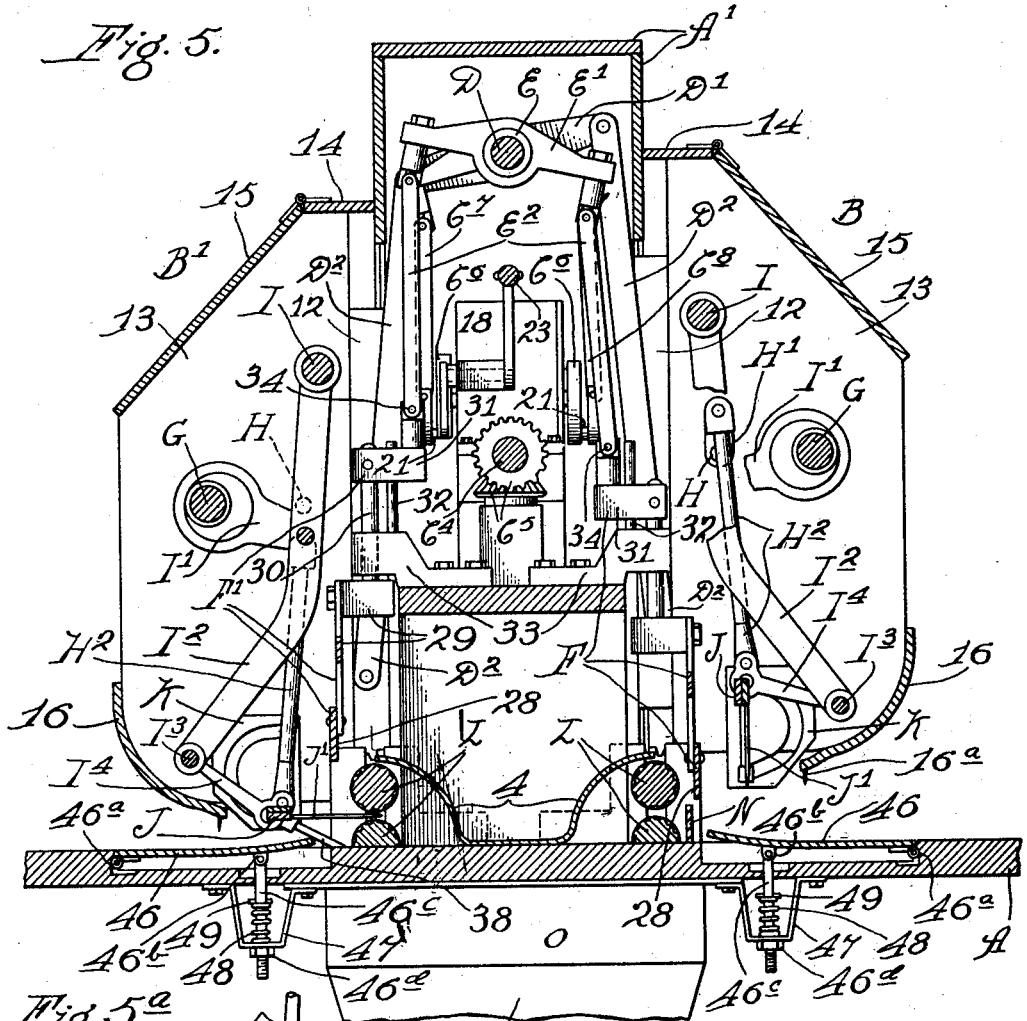

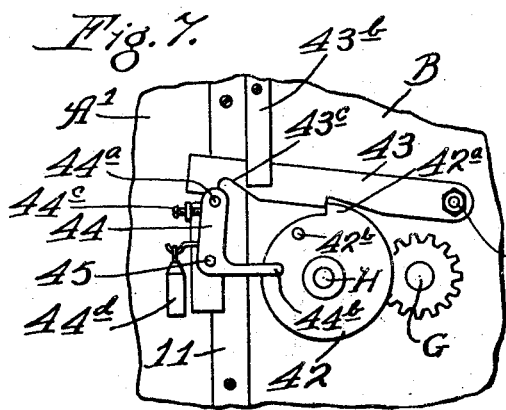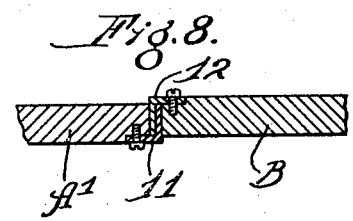

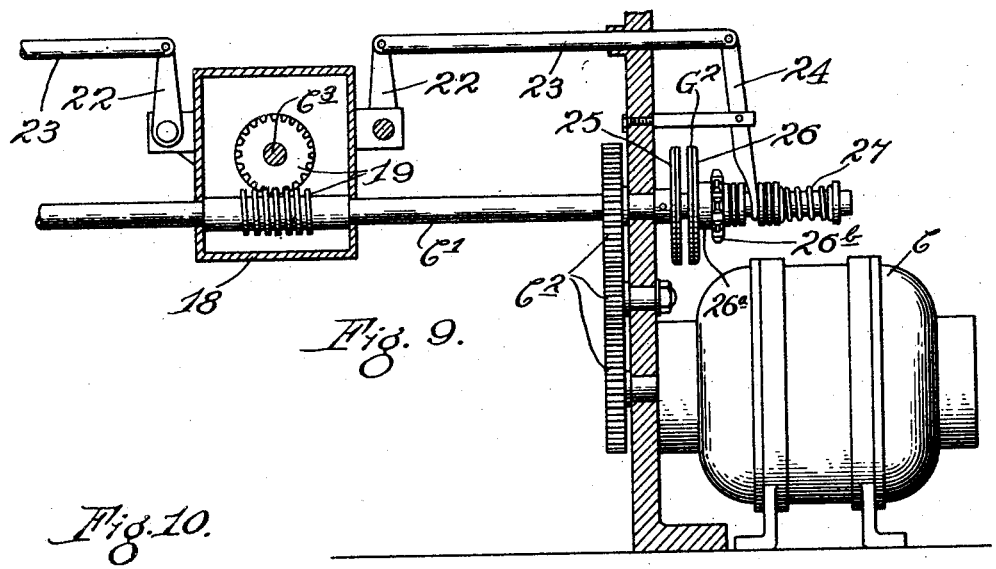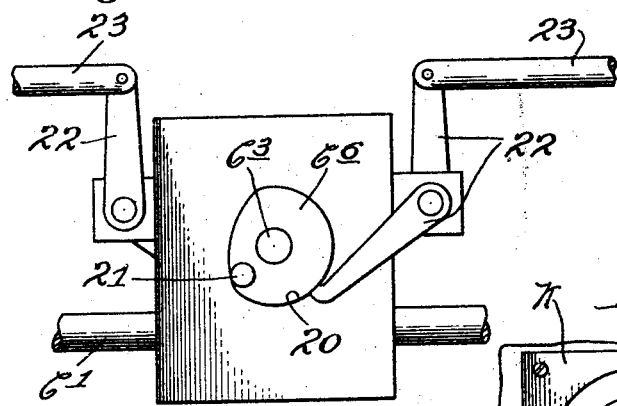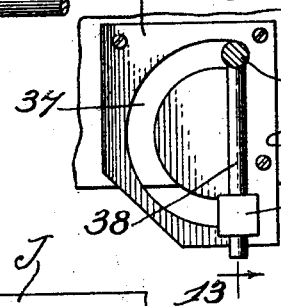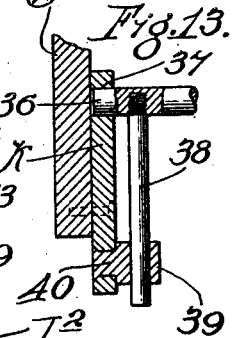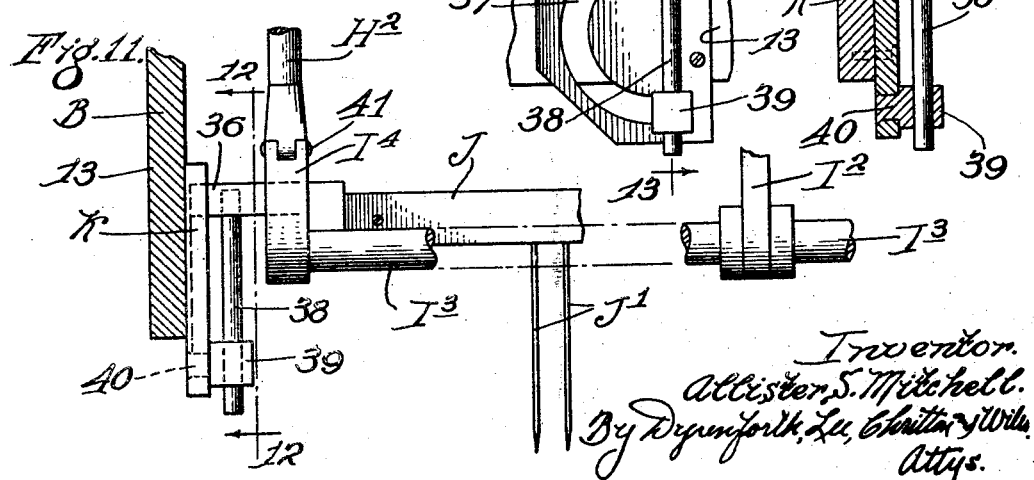

1,882,515

UNITED STATES PATENT OFFICE

ALLISTER S. MITCHELL, OF OAKLAND, CALIFORNIA, ASSIGNOR TO NATIONAL AUTOMOTIVE FIBRES, INC., OF DETROIT, MICHIGAN, A CORPORATION OF DELAWARE

STUFFING-RELIEVING PROCESS AND APPARATUS

Application filed November 10, 1930. Serial No. 494,817.

This invention relates particularly to a method of abstracting some of the filling from the pleats of cushions, and to apparatus adapted to facilitate the practice of the process.

The primary object is to provide a thoroughly practicable process for relieving, to a desired degree, the stuffed condition at the ends of the pleats of a cushion, and apparatus for economically accomplishing this result.

The invention defines a useful application in relieving the stuffed condition at the ends of the pleats, thus enabling the fabric to be sewed in a manner to close the ends of the pleats, and also facilitating the attachment of a skirt, if desired, previous to the application of the cushion to a seat or back, as, for example, the seat or back of an automobile.

The invention is illustrated in a preferred embodiment in the accompanying drawings, in which—

Fig. 1 is a side elevational view of a machine adapted to the practice of the improved process; Fig. 2, a plan view of the same; Fig. 3, a side elevational view (partly broken) showing the machine with the sidewall of a vertically reciprocating housing removed; Fig. 4, a broken transverse vertical sectional view, taken as indicated at line 4—4 of Fig. 3; Fig. 5, a section taken as indicated at line 5 of Fig. 3; Fig. 5$^a$, a fragmentary view illustrating the relation of the needles employed to the ends of the pleats just prior to the insertion of the needles; Fig. 5$^b$, a similar view showing the position after the needles have operated to remove some of the filling material from the pleats; Fig. 6, an end elevational view of the machine, viewed as indicated at line 6 of Fig. 3, the table upon which the mechanism is mounted being shown in section; Fig. 7, a view of a portion of the mechanism shown in Fig. 6; Fig. 8, a broken sectional view taken as indicated at line 8 of Fig. 6, showing the nature of the guide connections between the vertically reciprocating housings and the fixed central frame of the machine; Fig. 9, a broken sectional view taken as indicated at line 9 of Fig. 6, illustrating one of a pair of cam-controlled clutch devices employed; Fig. 10, a broken side elevational view of the mechanism shown at the left-hand portion of Fig. 9; Fig. 11, a broken vertical sectional view taken as indicated at line 11 of Fig. 4, illustrating a part of the mechanism for turning the needle-bar in a manner which will be understood from Figs. 5$^a$ and 5$^b$; Fig. 12, a broken sectional view taken as indicated at line 12 of Fig. 11, and Fig. 13, a broken section, taken as indicated at line 13 of Fig. 12.

It may be stated preliminarily that, according to the process herein described, needles are thrust through a fabric of the pleats a certain distance, and the needles are then quickly turned and thrust outwardly through the open ends of the pleats, thus parting the filling material (cotton-batting, for example), and pushing the separated material outwardly from the ends of the pleats; that preferably the stuffing material extruded is engaged by biting-rolls and drawn therethrough and at the same time brought within the action of a pneumatic conveyor (preferably a suction device).

Also, it may be stated that, in the preferred apparatus employed in the practice of the process, a central rigid frame mounted on a table houses certain operating mechanism: and a pair of vertically reciprocating housings are disposed at the sides of and slidably connected with the stationary housing, the reciprocating housings carrying the batteries of needles and the needle-actuating device.

In the preferred embodiment of the apparatus in accordance with the invention, A designates a table or platform upon which is securely mounted a main stationary central frame or housing A'; B and B', a pair of vertically reciprocating housings flanking the fixed central housing A'; C, (Figs. 3 and 9) an electric motor which serves to operate a shaft C' through the medium of a gear-train C$^2$; C$^3$, a short shaft extending transversely of the shaft C' and actuated through the medium of a worm and gear; C$^4$, a shaft in alignment with the shaft C' and actuated therefrom in a reverse direction through the medium of pinions C$^5$; and C⁶ (Figs. 5 and 10) a pair of cams secured to the ends of the shaft C³, said means being equipped with wrist pins, having connected therewith connecting rods C⁷ and C⁸; D, an oscillating shaft extending the length of the main central housing and actuated by the connecting rod C⁷; D′, rock-beams secured to the ends of the shaft D and serving to actuate the housings B and B′ through the medium of links D²; E, a sleeve, or tubular shaft, oscillated by the connecting rod C⁸; E′, a cross-beam actuated by the tubular shaft E; E², connecting rods actuated by the rock-beam E′; F and F′, strippers actuated by the connecting rods E²; G, G, shafts journaled in the reciprocable housings B and B′, said shafts being actuated by sprocket chains G′ disposed at opposite ends of the machine, the operation of the sprocket-chains being controlled by clutch devices G²; H, H, crank shafts journaled in the movable housings and geared to the shafts G, said crank shafts being equipped with cranks H′ with which are connected links H² which serve to raise and lower the needle-bars; I, I, oscillating shafts journaled in the movable housings and actuated by pitmen I′, the shafts I having fixedly secured thereto depending arms I² which carry a connecting shaft I³ which is pivotally connected with the free ends of arms I⁴ which are connected with the needle-bars and which serve to turn the needle-bars in the manner illustrated in Fig. 5ᵇ; J, J, horizontally disposed needle-bars carried by the links H² and the arms I⁴, said bars being equipped with needles J′, which extend perpendicularly to the bars; K, K, cam-plates secured to the inner sides of the lower portions of the ends of the movable housings B and B′ and serving to guide the needle-bars in their combined movement of depression and turning; L, L, pairs of picker-rolls journaled in the main central housing and cooperating with the needles which serve to thrust cotton out of the ends of the pleats; M, M, cushions supported on the table in a manner which will be understood from Figs. 2 and 4, the open ends of the pleats being presented towards the picker-rolls, or biting rolls L; N, N, longitudinally disposed stop-bars (Fig. 4) carried by the movable housings (Fig. 3) by means of straps N′; and O, a pneumatic device, preferably a suction device which coacts with the above-mentioned means for removing cotton from the pleats, the device O being equipped with a conduit O′ which leads to a suitable bin or chamber for receiving the extracted cotton, the device thus serving as a pneumatic conveyor.

The table A is somewhat wider than the machine, as appears from Fig. 2, one lateral edge of the table appearing in Fig. 2, being designated 1. The machine is thus disposed longitudinally of the table, the movable housings being disposed at a sufficient distance from the edges of the table to enable the cushions M to be properly positioned with reference to the cotton removing devices.

The main central housing A′ is fixedly secured on the table, it being understood that the wall of the table is cut away or recessed, as indicated at 2 in Fig. 4, to permit suction to be exerted from the device O through the spaces 3 between the rolls L. As appears from Fig. 4, shields 4 are so disposed between and over the pairs of rolls as to assure the main suction action being exerted at the bites of the rolls.

The rolls are actuated by a sprocket-chain 5 from the shaft C⁴, the chain 5 serving to actuate a shaft 6 which is connected by a sprocket chain 7 to one set of rolls. The shaft 6 also actuates a gear 8, which in turn actuates a sprocket device 9 which is connected with the other set of rolls L.

As appears from Fig. 3, the rolls L are connected together at one end by gears 10.

The housings B and B′ are slidably connected with the ends of the main central housing A′ in any suitable manner. In the illustration given, the end standards of the main central housing are equipped with angle-form guides 11 and the ends of the movable housings are equipped with angle-form guides 12, the guides being related in the manner shown in Fig. 8.

As appears from Fig. 4, the movable housings are suspended from the rock-beams D′ through the medium of the links D² so that the housings serve to counter-balance each other. The mechanisms are duplicated at opposite sides of the machine, but the operation of these mechanisms is in alternation.

One operator may treat cushions at one side of the machine while another operator treats cushions at the opposite side of the machine.

Each of the movable housings B and B′ is shown as comprising end walls 13; a connecting top piece 14; a hinged top-plate 15 which rests on beveled edges with which the end plates 13 are provided; lower shields 16 which are curved in the manner shown in Figs. 4 and 6; and removable panels 17 which are fitted with glass-plates 17ª. The motor C is geared to the shaft C′ in the manner shown in Figs. 3 and 9. The shaft C′ and the alignment shaft C⁴ rotate continuously when the motor operates. Also, the shaft C³ which serves both as a cam-shaft and as a crank-shaft operates continuously. The transverse shaft C³ is journaled in a gear box 18 and is driven by a worm and gear, as indicated at 19 in Fig. 9.

Outside the gear box 18, the projecting ends of the shaft C³ have secured thereto the disks C⁶. These disks are provided circumferentially with cam surfaces 20. They are also equipped with wrist pins 21 which serve to actuate the connecting rods $C^7$ and $C^8$. The cam surfaces 20 control the position of rock-levers 22 which are connected by links 23 with clutch-shifting levers 24 which control the clutches $G^2$.

As stated, the shafts $C'$ and $C^4$ rotate continuously. Each is equipped with a friction disk 25 which coacts with a disk 26 secured on a rotatable sleeve $26^a$ which is pressed inwardly, when the lever 24 permits, by a spring 27. The sleeves $26^a$ are equipped with sprocket wheels $26^b$ which serve to actuate the sprocket chains $G'$. That is, when the sleeves $26^a$ are clutched to the shafts $C'$ or $C^4$, the sprocket chains $G'$ will be driven. The operation is such that the shafts $G$ will rotate through two revolutions at each operation of the sprocket chains $G'$.

Each of the stripper devices $F$ and $F'$ comprises a longitudinal bar 28 carried by a yoke 29 (Figs. 3 and 5). The yoke is carried by a plunger 30 secured to a cross-head 31 which slides vertically on a guide-pin 32. The plunger 30 also slides through a guide 33 carried by the main frame. The cross-head 31 is connected with the connecting rod $E^2$ by a pivot 34.

The shafts $G$, which are periodically actuated through two revolutions, are connected with and serve to actuate the crank shafts $H$, through the medium of gears 35 (Figs. 2 and 6).

The manner in which the cranks $H'$ are connected, through the medium of the connecting rods $H^2$, with the needle-bars $J$ will be understood best from Figs. 3, 5 and 11. The longitudinally extending needle-bars $J$ are equipped at their extremities with cam-studs 36 which are movable in half circular (approximate) cam-slots 37 with which the cam-plates $K$ are provided. The cam-studs 36 have secured thereto and projecting perpendicularly therefrom guide-pins 38 which are movable through perforations in blocks 39 which are connected, by pivots 40, with the lower portions of the cam-plates $K$. The arms $I^4$ which are connected by the cross-rods $I^3$ are fixedly secured to the cam-studs 36 and are provided with lugs which are connected by pivots 41 to the lower ends of the connecting rods $H^2$.

The operation of the plucking mechanism is such that the needle-equipped bar has a movement of translation during the descent of the housing which carries the mechanism so that the needles will be thrust through the fabric and into the cotton in the pleats. After the housing reaches the lower end of its descent, the needle-bar has a further movement of translation combined with a turning movement. In this operation, portions of the cotton in the pleats are, in effect, plucked or pried loose from the remaining cotton in the pleats and thrust outwardly through the open ends of the pleats, the plucked cotton being thus brought within the range of action of the picker-rolls $L$, through the spaces between which the suction is exerted, also.

As has been pointed out, the housing, or carriers $B$ and $B'$ for the plucking mechanisms, are alternately raised and lowered by mechanism mounted in the main central housing $A'$, the actuation of said carriers being effected through the medium of the connecting rods $D^2$.

Periodically, the sprocket-chains $G'$ are actuated, in alternation. One of these chains is located at each end of the machine. After the descent of the carrier or housing $B'$, for example, the sprocket-chain $G'$ shown in Fig. 6, is actuated to revolve the shaft $G$ through two revolutions, it being borne in mind that the housing has by this time lowered the plucking mechanism so that the needles $J'$ had been thrust through the fabric and into the cotton. During the time that the shaft $G$ makes two revolutions, the shaft $H$ makes one revolution, thus lowering the connecting rods $H^2$. The effect is to cause the shiftable trunnions, or cam-pins 36, to follow the cam-slots 37, thus turning the needles through a quarter revolution and causing them to be thrust outwardly through the open end of the seams by the time the trunnions 36 travel to the lower ends of the curved slots. During the second revolution of the shaft $G$, the action of the needle-bar is reversed. Thereupon, the housing $B'$ is lifted away from the cushion, while the stripper $F'$ operates to strip the cushions from the needles.

As has been indicated, the crank-shaft $H$ is turned once during two revolutions of the shaft $G$.

The shafts $G$ and $H$ are normally locked against rotation in a manner which will be understood from Figs. 2, 6 and 7. Each shaft $H$ is equipped with a ratchet wheel 42 which is provided with a single tooth $42^a$ and equipped with a cam-stud $42^b$. The tooth is engaged by a notch in a pawl 43 which is pivoted at $43^a$ and confined to vertical movement by a guide $43^b$. The pawl is provided with a notch $43^c$.

Upon the end standard of the main central housing $A'$ is supported a bell-crank lever 44 which is mounted on a pivot 45. One arm of the bell-crank is equipped with a stud $44^a$. The other arm is designated $44^b$. The vertical arm of the member 44 is normally held against an adjustable stop $44^c$ by means of a weight $44^d$.

Normally the ratchet wheel 42 is restrained against turning in the manner illustrated in Fig. 6. When the housing $B$ approaches the lower end of its movement the pawl 43 strikes the stud $44^a$ and is caused to release the tooth $42^a$ of the ratchet wheel, thus permitting rotation of the shafts $G$ and $H$, it being understood that the clutch device $G^2$ has in the meantime connected the shaft $G$ to the continuously rotating shaft C'. A moment after the tooth 42ª has passed the corresponding recess in the pawl 43, the cam-stud 42ᵇ strikes the arm 44ᵇ and throws the arm 44 in such position that the stud 44ª can enter the recess 43ᶜ, thus permitting the pawl 43 to return to proper position to again latch the ratchet wheel 42.

It will be understood that the table A is wide enough to project somewhat beyond the movable housing B and B' and thus afford platforms, or ledges, upon which the cushions may be supported during the plucking operation. The depth to which the needles may penetrate the cushions may be illustrated by means of longitudinal plates 46 which are pivotally connected with the platforms at 46ª. These plates are equipped with ears 46ᵇ from which depend bolts 46ᶜ. These bolts extend through brackets 47 carried by the platforms and are equipped with nuts 46ᵈ. Springs 48 are interposed between the brackets and collars 49 on the bolts.

It will be understood that the inner marginal portion of the cushions may be raised or lowered through the medium of the supporting plate 46, which may be adjusted through the medium of the bolts 46ᶜ, thus regulating the depth to which the needles are inserted in the filling material. In this manner, the amount of material to be plucked from the pleats may be regulated.

It may be stated here that where pleated, stuffed cushions are produced in a machine in which the fabrics and the strips of filling material, such as cotton batting, are simultaneously fed through the machine and the fabrics are sewn together, it is desirable to reduce the amount of stuffing at the end of the pleats. This permits the cushion to be sewn through the reduced marginal portion, if desired. Also, it facilitates the attachment of a flap, where desired. Also, it enables the marginal portion of the cushion to be turned over a corner to best advantage.

The operation of the machine may be stated briefly: an operator stands at each side of the table on which the machine is mounted. A stack of cushions may be placed upon the table within convenient reach of the operator. The operator places a cushion, with the lining side up, beneath the movable housing B or B' as the case may be, the open ends of the pleats being presented towards the picker-rolls L. At this time, the housing is in the elevated position and the stop N is in position to stop the cushions when it is shoved into the proper position. The housings, or plucking-mechanism carriers B and B', rise and fall alternately. As the carrier approaches the cushion, the needles are thrust through the lining near the open ends of the pleats. At the proper instant, the clutch G² operates to connect the sprocket-chains G' to the continuously rotating shaft (C' for example). Thereupon, the shaft G is turned two revolutions and the shaft H is turned one revolution, it being noted that the ratchet wheel 42 is released (Fig. 7) at the moment the housing reaches the lower end of its movement. This causes the plucking-mechanism carried by the housing to operate, in which operation the needle-bars are turned and caused to be protruded through the open ends of the seams, in which movement some of the cotton is plucked from the filled seams and extruded through the open ends of the seams. The plucked cotton is brought within the action of the picker-rolls L and suction-device O. It will be understood that the conveyor conduit O' is equipped at some convenient point with a suction fan, and the plucked cotton is thus gathered and conveyed through the conveyor conduit to a bin for receiving same.

As shown in Figs. 4 and 5ᵇ, the members 16 of the housings B and B' are equipped at their lower edges with pins, or brads, 16ª which are adapted to protrude through the cushion-lining and engage the cotton, thus serving to hold the cotton back of the breaking or tearing line.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A method of withdrawing stuffing material from the pleats of upholstery which comprises: thrusting needles through the fabric casing of the pleats and outwardly through open ends of the pleats, thereby plucking the desired amount from the pleats, and gathering and removing the plucked material.

2. A method as specified in claim 1, in which suction is employed in the operation of gathering and removing the plucked material.

3. A method as specified in claim 1, in which the gathering and removing operation includes picking the plucked material and pneumatically conveying it from the zone where the picking action occurs.

4. In combination: plucking mechanism; means for supporting stuffed, pleated, upholstery with the filling material at the ends of the pleats within the range of action of said mechanism; and means for gathering and conveying the plucked material away from the plucking mechanism.

5. Apparatus comprising: plucking mechanism comprising needles and devices serving to operate the needles to effect plucking of material from the open end of stuffed upholstery; and means for removing the plucked material from the vicinity of the needles.

6. Apparatus as specified in claim 5, in which the last-mentioned element comprises a suction-conveyor.

7. Apparatus as specified in claim 5, in which the last-mentioned element comprises a suction-conveyor and in which a picker device is interposed between the plucking mechanism and the conveyor and aids in transferring the material from the plucking mechanism into the conveyor.

8. Apparatus comprising: means for supporting upholstery comprising stuffed pleats; a battery of needles; and devices operative to thrust the needles through a fabric of the pleats and outwardly through the pleat-ends, for the purpose set forth.

9. Apparatus as specified in claim 8, combined with a pneumatic conveyor cooperating with said needles.

10. Apparatus as specified in claim 8, in combination with a picker-device serving in the removal of material from the needles, and a suction-conveyor cooperating therewith.

11. Apparatus comprising: upholstery-supporting means; a needle-bar equipped with a series of needles projecting therefrom; and mechanism adapted to impart first a movement of transmission and then a turning movement to said needle-bar.

12. Apparatus as specified in claim 11, in which the needle-bar is equipped with cam-trunnions and in which said mechanism comprises connecting-rods, and actuating devices therefor, cams for guiding said needle-bar and permitting turning thereof, and means for turning the needle-bar about its trunnions during its movement of transmission.

13. Apparatus comprising: upholstery-supporting means; a reciprocating carrier; and plucking mechanism mounted on said carrier comprising a needle-bar equipped with a series of needles projecting therefrom; and mechanism for turning the needle-bar after the needles have been thrust through a fabric of the upholstery by the movement of said carrier.

14. In apparatus of the character set forth: an upholstery-supporting platform; a reciprocating carrier disposed over said platform; plucking-mechanism carried by said carrier; a stationary frame upon which the carrier is mounted; and means mounted on said stationary frame for actuating said carrier and driving said plucking mechanism.

15. Apparatus as specified in claim 14, combined with a pneumatic conveyor associated with said plucking mechanism.

16. Apparatus as specified in claim 14, combined with a suction-conveyor connected with said stationary frame, and a picker-device serving in the transfer of material from the plucking mechanism to said conveyor.

17. Apparatus comprising: cushion-supporting means; a stationary housing; a reciprocating housing; cotton-plucking mechanism mounted in said reciprocating housing; and actuating means mounted in said stationary housing serving to actuate said reciprocating housing and the plucking mechanism carried thereby.

18. Apparatus as specified in claim 17, in which the cotton-plucking mechanism comprises a needle-bar equipped with a series of needles, and actuating mechanism for said needle-bar adapted to turn the needle-bar with relation to the reciprocating housing.

19. Apparatus comprising: a stationary frame; a continuously rotating shaft journaled therein; a reciprocable housing actuated from said shaft; a plucking device carried by said housing; cushion-supporting means; and mechanism mounted in said housing and periodically actuated by said shaft.

20. Apparatus as specified in claim 19, combined with a conveyor which carries the plucked material from the vicinity of the plucking device.

21. In combination: a main central housing; a pair of flanking housings adapted to be reciprocated alternately; plucking mechanisms mounted in the reciprocable housings; actuating means mounted in the main housing and having the reciprocable housings connected therewith in counterbalanced relation; and periodically actuated devices connected with the actuating mechanism mounted in the main housing and serving to actuate said plucking mechanisms alternately periodically.

22. Apparatus as specified in claim 21, in combination with a table affording cushion supports and a suction-conveyor adapted to receive the plucked material from the plucking mechanisms.

23. In apparatus of the character set forth: a cushion-supporting table equipped with an adjustable cushion support; a reciprocating carrier; plucking mechanism mounted on said carrier; and means for periodically actuating said plucking mechanism.

24. Apparatus as specified in claim 23, in which the plucking mechanism comprises a needle-bar equipped with a series of projecting needles adapted to be thrust through a fabric of the cushion and means for turning the needle-bar to effect extrusion of filling material in the cushion.

25. Apparatus as specified in claim 23, in which the plucking mechanism is characterized by a needle-carrying bar equipped with cam-trunnions adapted to travel in cam-guides with which the carrier is equipped and is further characterized by reciprocating connecting rods for raising and lowering the needle-bar with relation to the carrier and by actuating levers for turning the needle-bar with relation to the carrier.

26. Apparatus comprising: a cushion support; a reciprocating carrier; plucking mechanism mounted on said carrier, including a pair of shafts geared together; a stationary frame; actuating mechanism mounted in said stationary frame, including a continuously rotating shaft and means actuated therefrom for reciprocating said carrier; clutch-controlled transmission means for communicating motion from said continuously rotating shaft to one of said first-mentioned shafts; and a clutch actuated from said continuously rotating shaft controlling the operation of said clutch-controlled mechanism.

27. Apparatus comprising: a stationary housing; a reciprocating housing, plucking mechanism mounted in said reciprocating housing, said mechanism including a rotary shaft and a normally latched device adapted to restrain the shaft against rotation; actuating mechanism mounted in said stationary housing serving to actuate the reciprocating housing; periodically actuated transmission means actuated from said last-mentioned mechanism and serving to actuate said first-mentioned shaft; and means carried by the main housing adapted to effect release of said shaft during the descent of said reciprocating housing.

28. A method of withdrawing stuffing material from upholstery, which comprises: plucking such material from the open end of the upholstery by means applied through the fabric covering of the upholstery, and removing the plucked material from the zone of the plucking action.

29. A method of withdrawing stuffing material from upholstery, which comprises: plucking such material from the open end of the upholstery by means applied through the fabric covering of the upholstery while holding back the material to be retained, and removing the plucked material from the zone of the plucking action.

30. In apparatus of the character set forth, plucking mechanism adapted to pluck a portion of the filling material from a stuffed upholstery casing, means for withholding the remainder of the filling material from the plucking means; and means for removing the plucked material from the plucking mechanism.

31. In apparatus of the character set forth, means applied through the fabric covering of an upholstery casing for plucking filling material therefrom, and means for removing the plucked material from the plucking mechanism.

32. In combination: mechanism for plucking filling material from a stuffed upholstery casing; means for withholding the filling material to be retained in the casing, means for supporting the stuffed upholstery casing with the filling material within the range of action of said mechanism, and means for gathering and conveying the plucked material away from the plucking mechanism.

33. In apparatus of the character set forth: plucking mechanism adapted to pluck filling material from stuffed upholstery; and means for removing the plucked material from the plucking mechanism comprising a pneumatic conveyor and an auxiliary device serving to take the material from the plucking mechanism and deliver it to the conveyor.

ALLISTER S. MITCHELL.